US012196017B2

(12) United States Patent
Lin

(10) Patent No.: US 12,196,017 B2
(45) Date of Patent: Jan. 14, 2025

(54) VEHICLE DOOR LOCK ASSEMBLY

(71) Applicant: RV MASTER TECH CO., LTD., Yuanlin (TW)

(72) Inventor: Chia-Cheng Lin, Yuanlin (TW)

(73) Assignee: RV MASTER TECH CO., LTD., Yuanlin (TW)

( * ) Notice: Subject to any disclaimer, the term of this patent is extended or adjusted under 35 U.S.C. 154(b) by 224 days.

(21) Appl. No.: 17/973,872

(22) Filed: Oct. 26, 2022

(65) Prior Publication Data

US 2024/0141707 A1 May 2, 2024

(51) Int. Cl.
*E05B 85/16* (2014.01)
*E05B 81/06* (2014.01)
*E05B 81/76* (2014.01)

(52) U.S. Cl.
CPC .............. *E05B 85/16* (2013.01); *E05B 81/06* (2013.01); *E05B 81/76* (2013.01); *E05Y 2400/852* (2013.01); *E05Y 2900/531* (2013.01)

(58) Field of Classification Search
CPC .......... E05B 85/00; E05B 85/16; E05B 81/06; E05B 81/76; E05Y 2400/852; E05Y 2900/531; Y10T 70/60; Y10T 70/625; Y10T 70/65
USPC .................................................... 70/262–264
See application file for complete search history.

(56) References Cited

U.S. PATENT DOCUMENTS

| | | | | |
|---|---|---|---|---|
| 2018/0347243 | A1* | 12/2018 | Ryan | E05B 83/44 |
| 2023/0081813 | A1* | 3/2023 | Couto Maquieira | E05B 81/90 70/279.1 |
| 2023/0228123 | A1* | 7/2023 | Van der Wal | E05B 47/0004 70/264 |
| 2024/0141703 | A1* | 5/2024 | Lin | E05B 81/72 |

FOREIGN PATENT DOCUMENTS

| | | | | |
|---|---|---|---|---|
| CN | 111648681 | A * | 9/2020 | E05B 81/04 |
| CN | 113622762 | A * | 11/2021 | E05B 77/34 |
| DE | 202005013372 | U1 * | 4/2006 | E05B 59/00 |
| DE | 102018124159 | A1 * | 4/2020 | E05B 47/0607 |
| DE | 102019128484 | A1 * | 11/2020 | E05B 65/1026 |
| EP | 0420037 | A2 * | 9/1990 | E05C 1/14 |
| EP | 2407618 | B1 * | 1/2019 | E05B 63/14 |
| EP | 3951121 | A1 * | 2/2022 | E05B 81/06 |
| FR | 3113080 | A1 * | 2/2022 | E05B 77/06 |

* cited by examiner

*Primary Examiner* — Suzanne L Barrett
(74) *Attorney, Agent, or Firm* — MUNCY, GEISSLER, OLDS & LOWE, P.C.

(57) ABSTRACT

A vehicle door lock assembly includes a housing, a first locking assembly and a second locking assembly. The first locking assembly includes an inner handle, an outer handle, a first lock and a first lock tongue. The first lock tongue has a tendency to move outward of the housing, and the inner and outer handles respectively control the first lock tongue to move inward of the housing. The first lock is connected with a first blocking member. The second locking assembly includes a control member, a second lock and a second lock tongue. The second lock is connected with a second blocking member, and the second lock and the control member are co-movable. The second lock drives the second lock tongue (Continued)

to move outward of the housing when locked, and the second lock drives the second lock tongue to move inward of the housing when unlocked.

10 Claims, 11 Drawing Sheets

VEHICLE DOOR LOCK ASSEMBLY

BACKGROUND OF THE INVENTION

Field of the Invention

The present invention relates to a vehicle door lock assembly.

Description of the Prior Art

Doors of a vehicle such as van or camper generally have door lock assemblies respectively disposed thereon. A conventional door lock assembly includes a first lock tongue and a second lock tongue, the second lock tongue is used to lock a door of the vehicle, and the first lock tongue has a tendency to move outward and be elastically abutted against the door for opening and closing the door. An inner handle and an outer handle of the door lock assembly can effectively control the first lock tongue to move inward. The first lock tongue further has a lock, and a locking member of the lock is blockable with the outer handle when the lock is locked so that the outer handle cannot be actuated and the first lock tongue cannot be move inward, which prevents the door from being opened. However, when a sufficient force is exerted on the outer handle, the outer handle still can drive the locking member to move, and the first lock tongue will be driven by the outer handle and moved inward, which has insufficient security.

The present invention is, therefore, arisen to obviate or at least mitigate the above-mentioned disadvantages.

SUMMARY OF THE INVENTION

The main object of the present invention is to provide a vehicle door lock assembly, which has a good structural strength and avoids being compulsorily unlocked.

To achieve the above and other objects, the present invention provides a vehicle door lock assembly, including: a housing, a first locking assembly and a second locking assembly. The housing includes an inner side and an outer side. The first locking assembly is disposed on the housing and includes an inner handle, an outer handle, a first lock and a first lock tongue, and the first lock tongue has a tendency to move outward of the housing. The inner handle and the outer handle are movably disposed on the housing and respectively control the first lock tongue to move inward of the housing, and the first lock is connected with a first blocking member. When the first lock is locked, the first lock drives the first blocking member to move, the first blocking member is blocked with the outer handle so that the first lock tongue is uncontrollable to move inward of the housing by the outer handle. When the first lock is unlocked, the first lock drives the first blocking member to be unblocked with the outer handle. The second locking assembly is disposed on the housing and includes a control member, a second lock and a second lock tongue, and the second lock is connected with a second blocking member. The second lock and the control member are co-movable with each other. The second lock drives the second lock tongue to move outward of the housing when locked, and the second lock drives the second lock tongue to move inward of the housing when unlocked. When the second lock is locked, the second blocking member is blocked with the outer handle so that the first lock tongue is uncontrollable to move inward of the housing by the outer handle. When the second lock is unlocked, the second blocking member is unblocked with the outer handle so that the first lock tongue is controllable to move inward of the housing by the outer handle.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
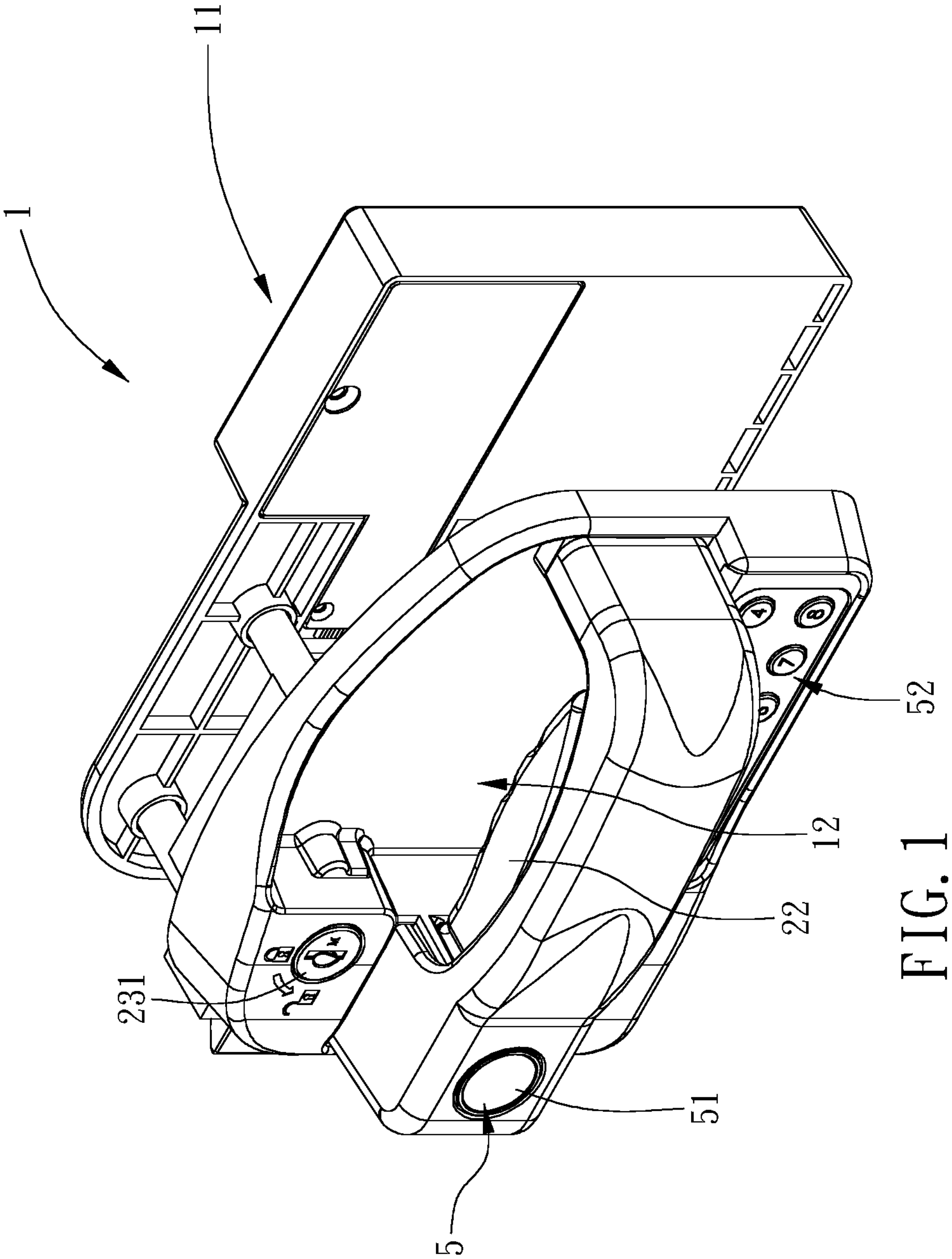
FIG. 1 is a stereogram of a preferable embodiment of the present invention.
Figure 2:
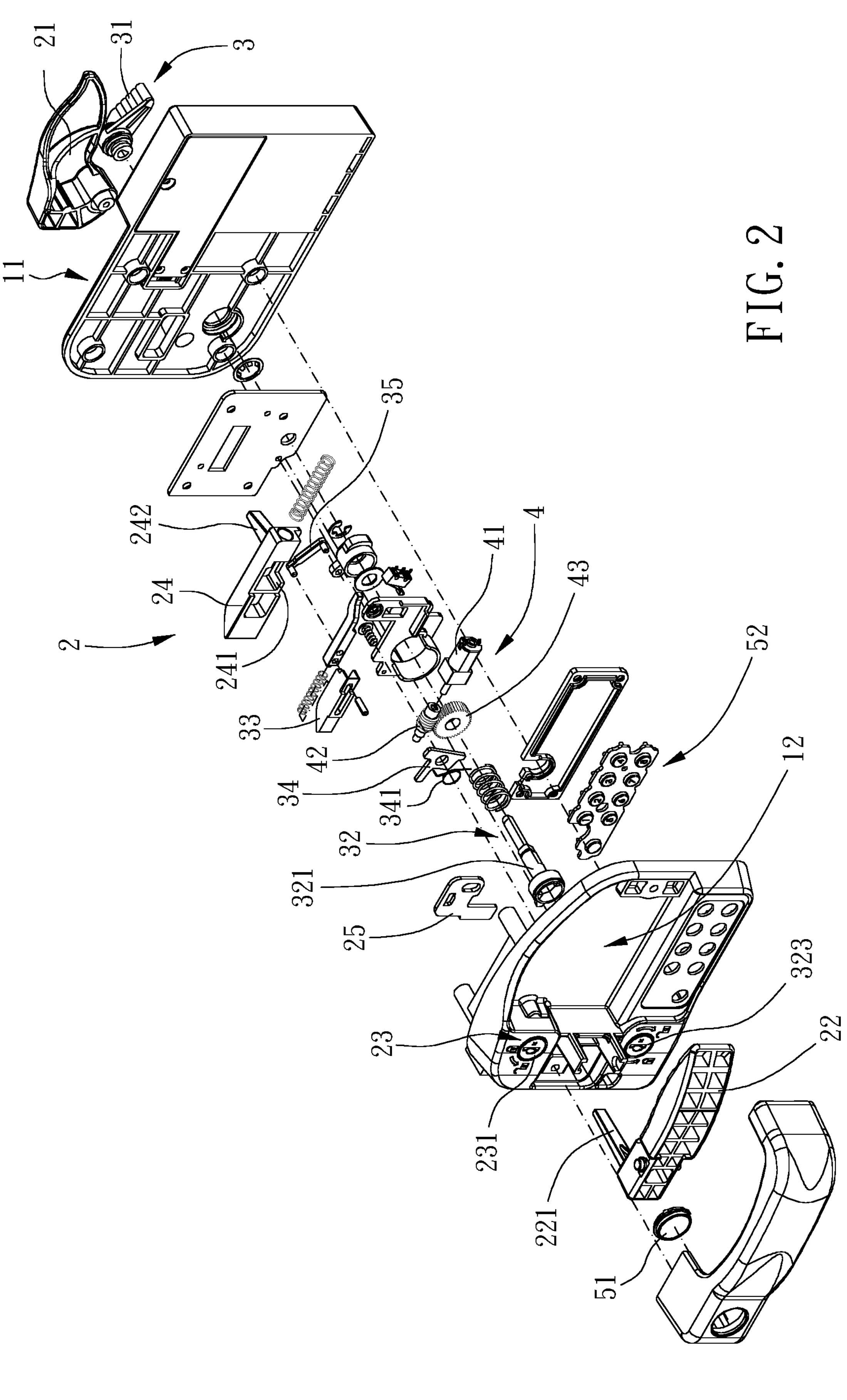
FIGS. 2 and 3 are breakdown drawings of a preferable embodiment of the present invention.
Figure 3:
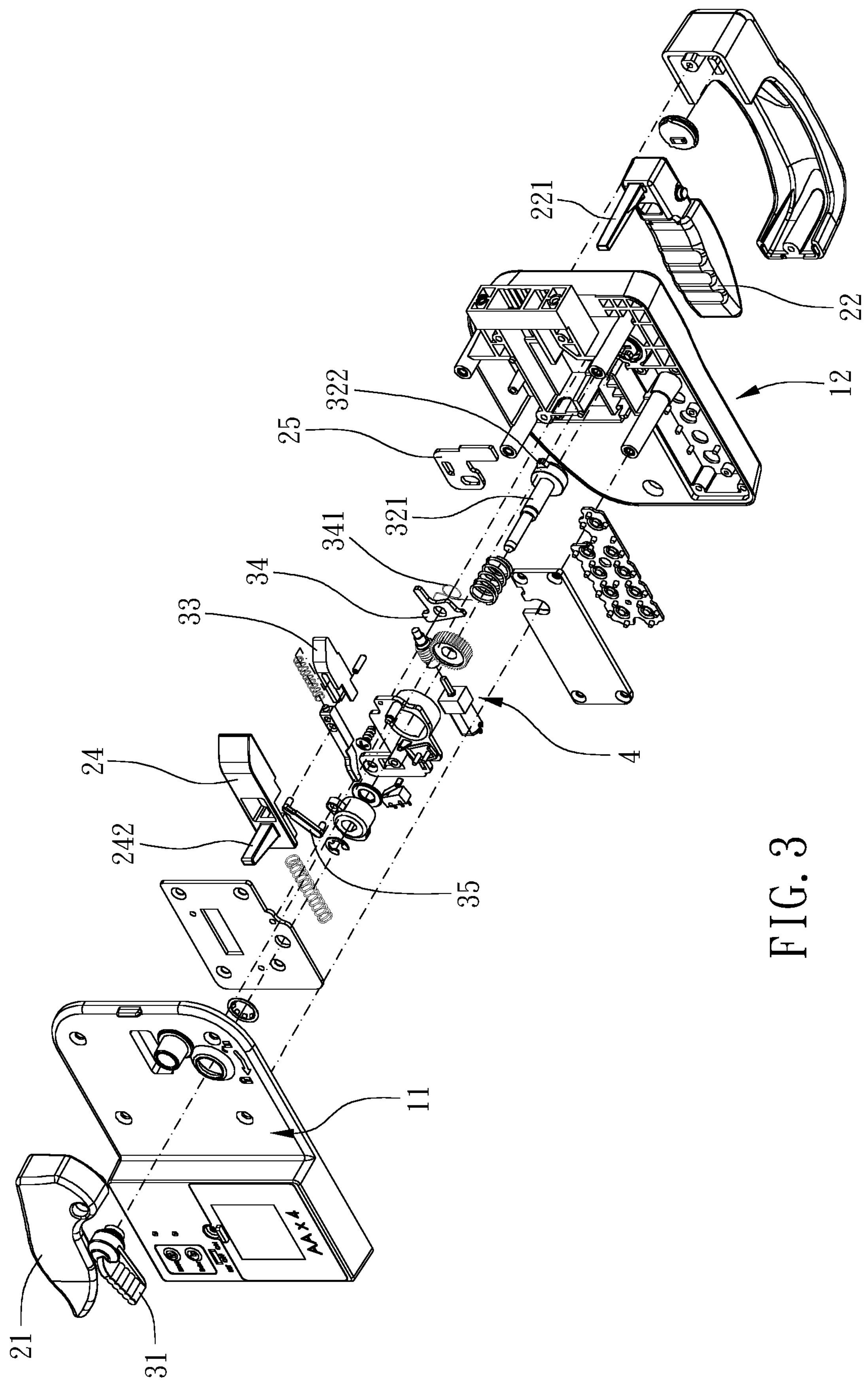
Figure 4:
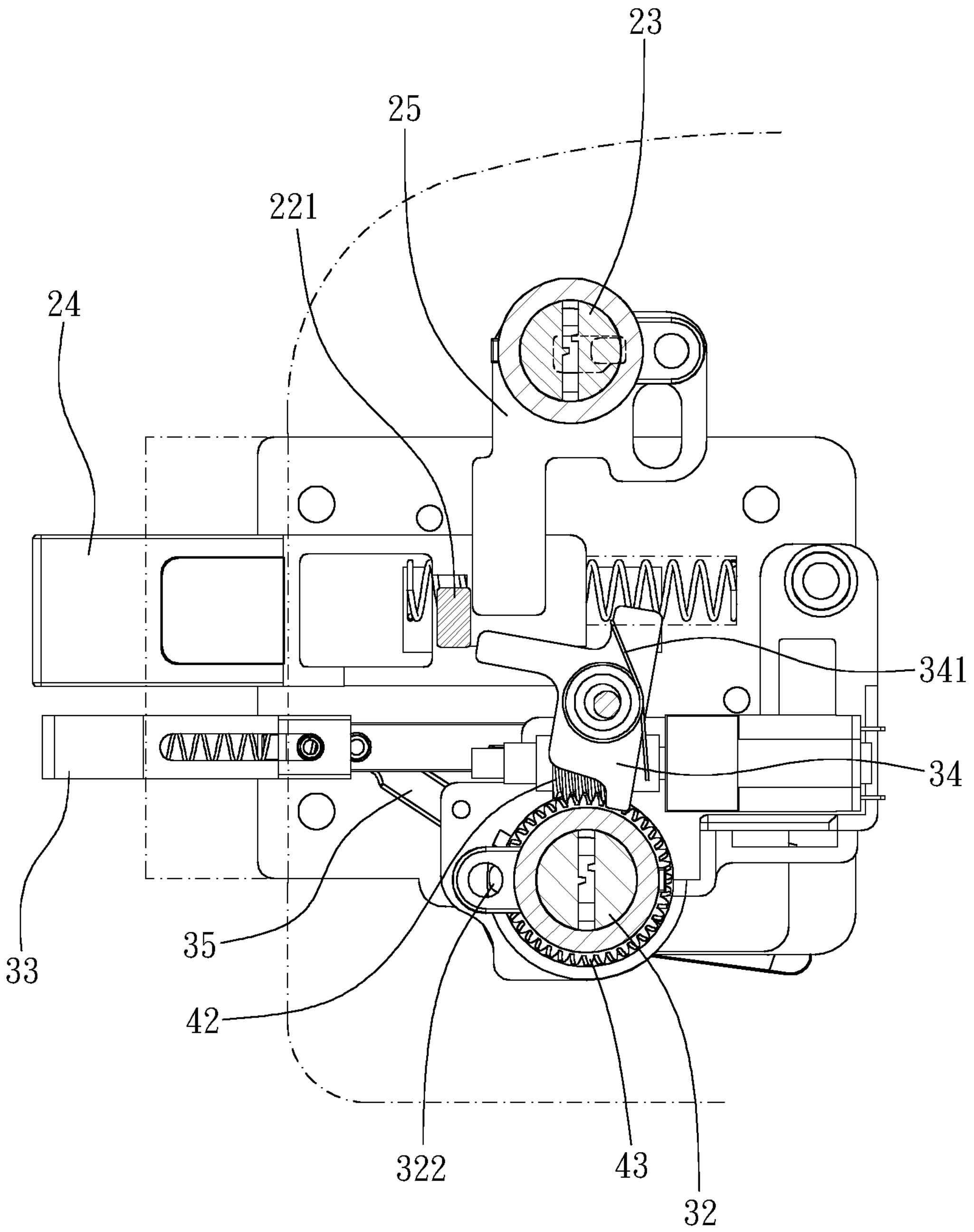
FIGS. 4 and 5 are front views showing operation of a preferable embodiment of the present invention.
Figure 5:
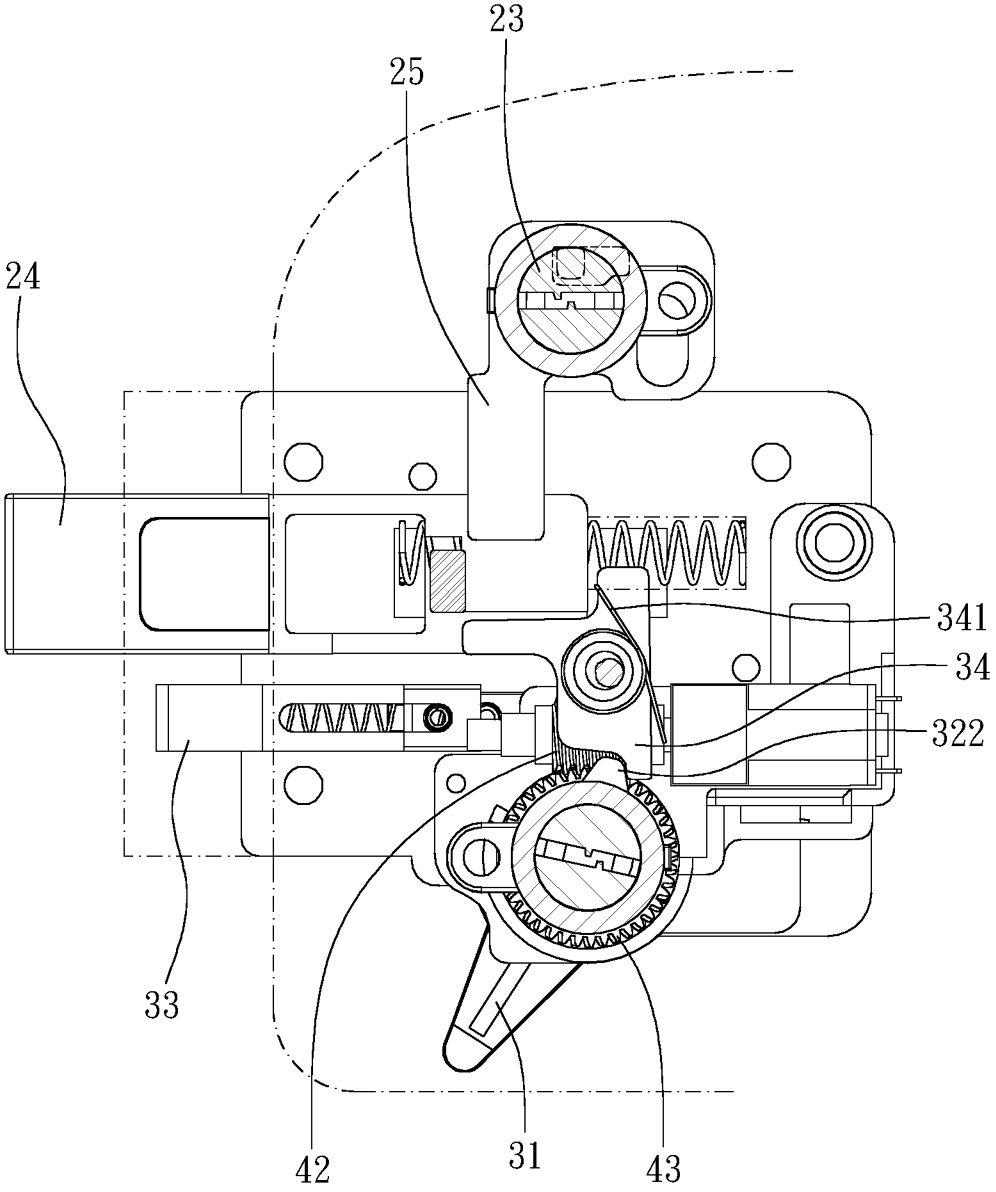
Figure 6:
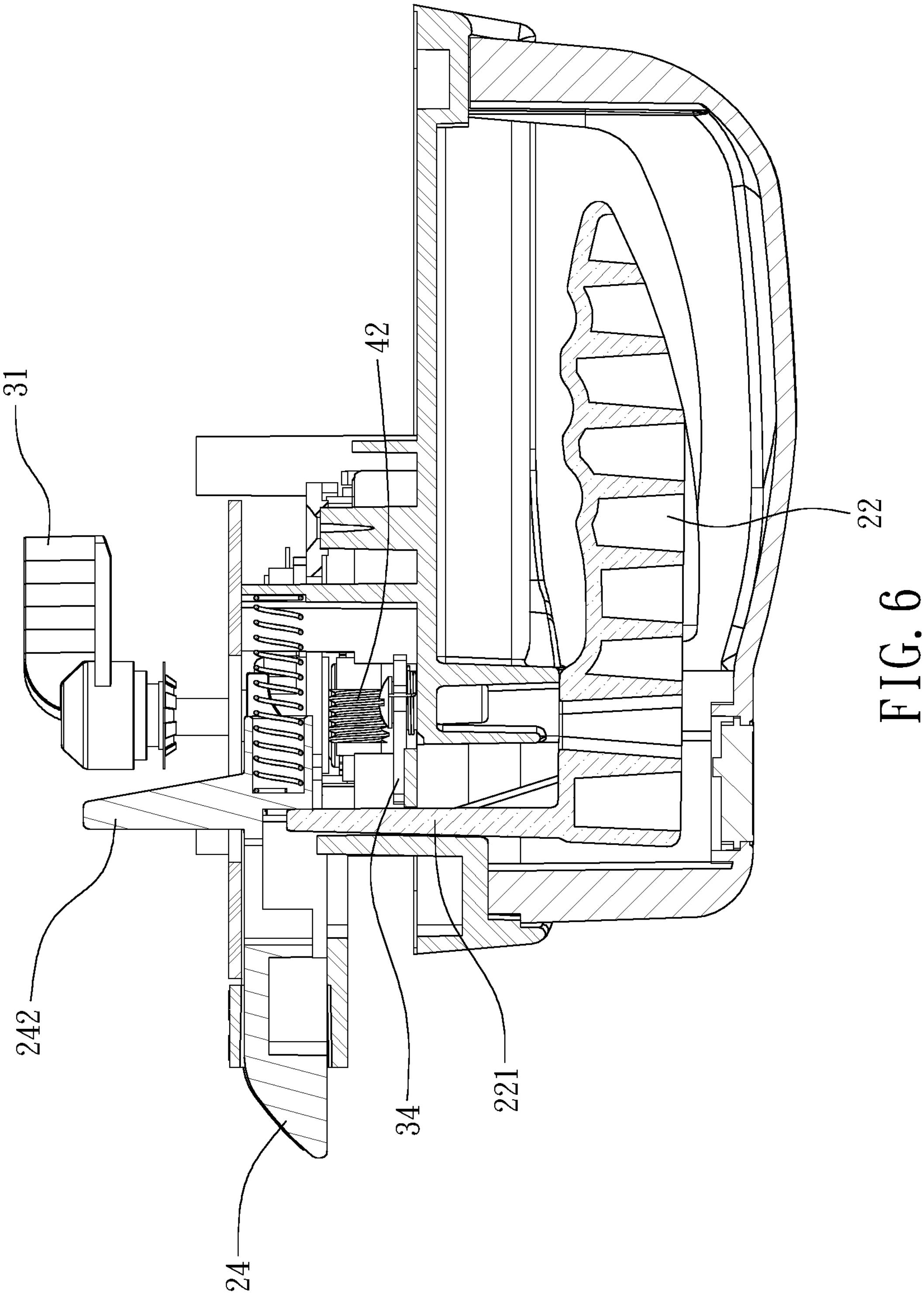
FIGS. 6 and 7 are top views showing operation of a preferable embodiment of the present invention.
Figure 7:
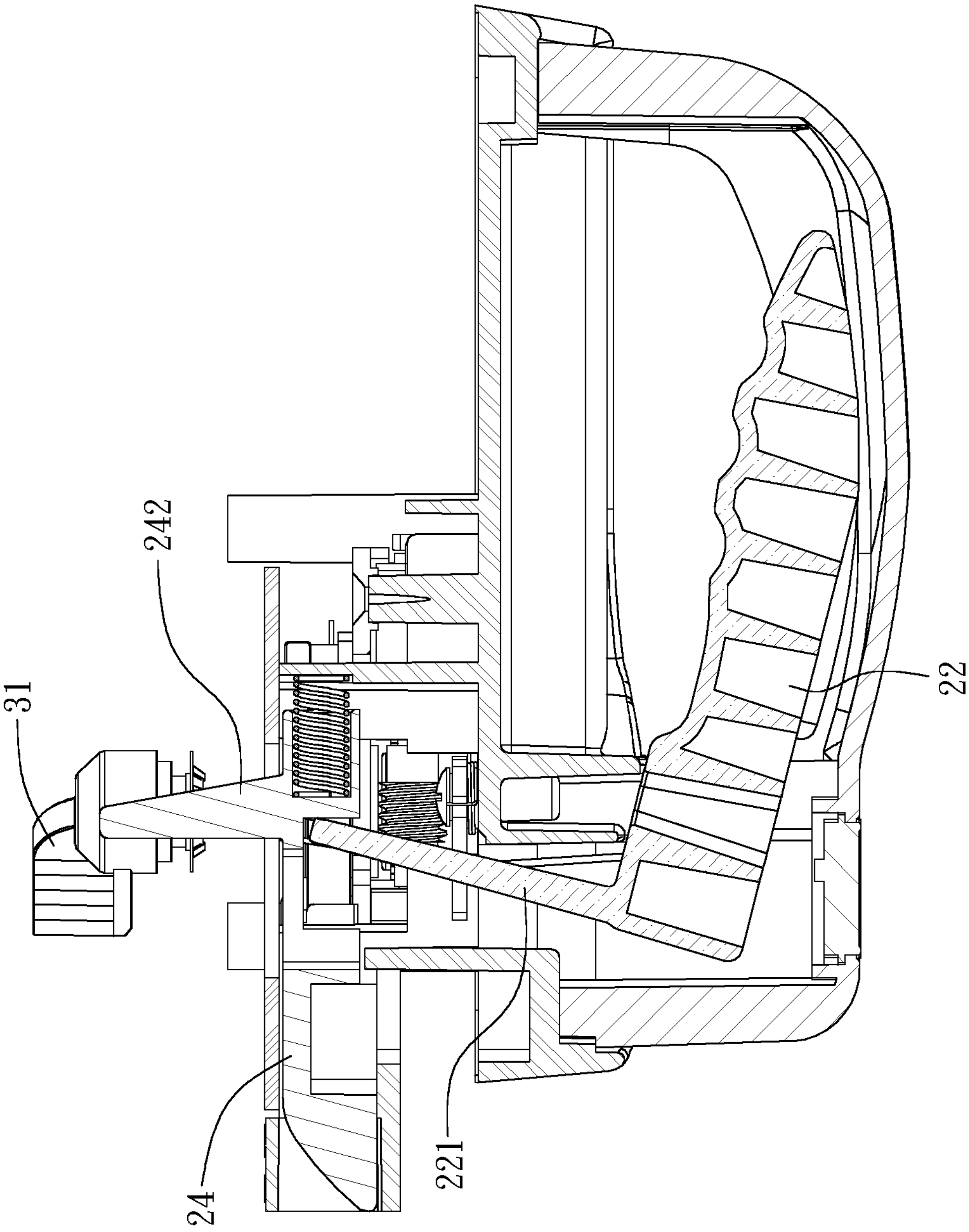
Figure 8:
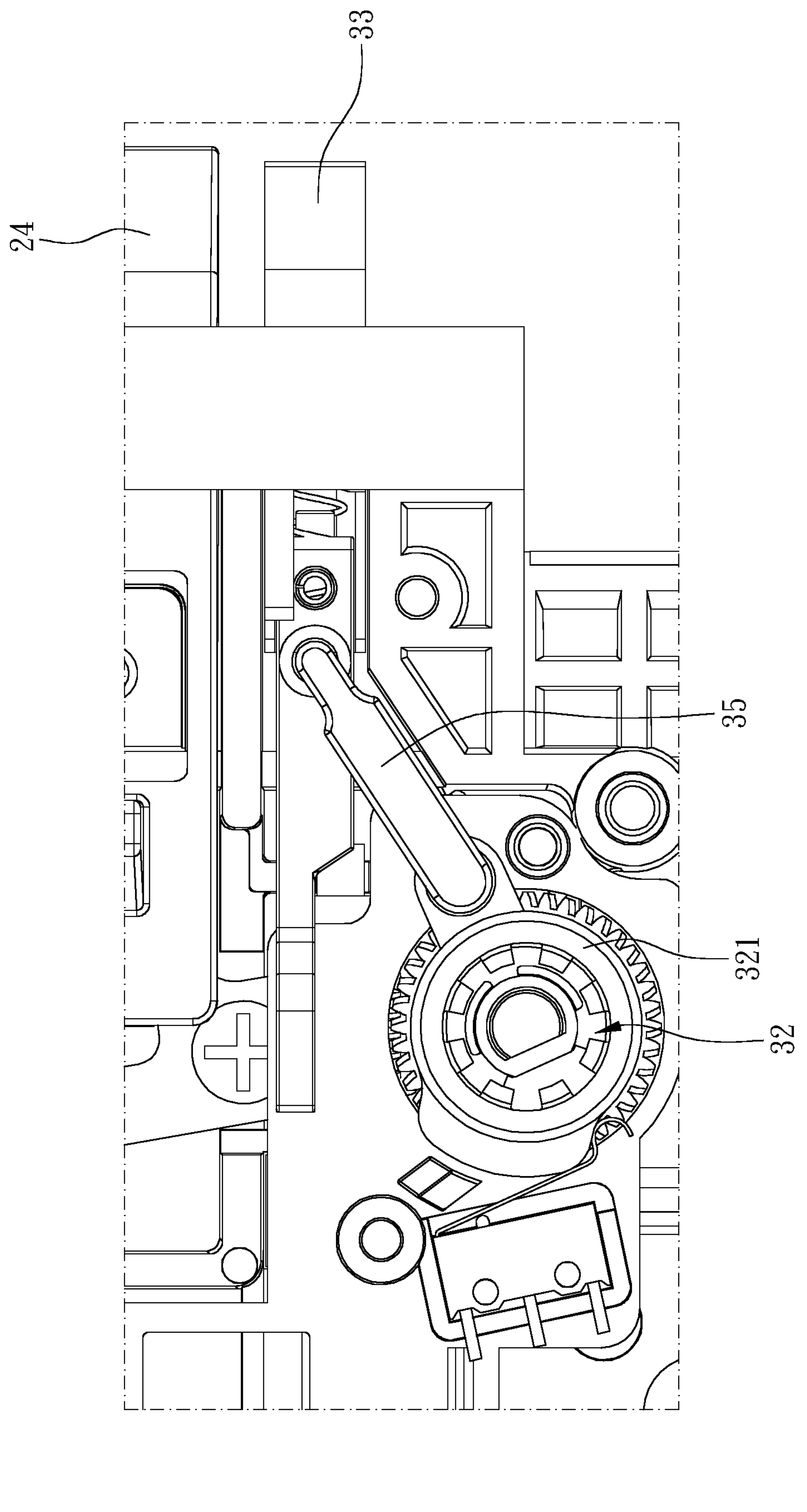
FIGS. 8-10 are rear views showing operation of a preferable embodiment of the present invention.
Figure 9:
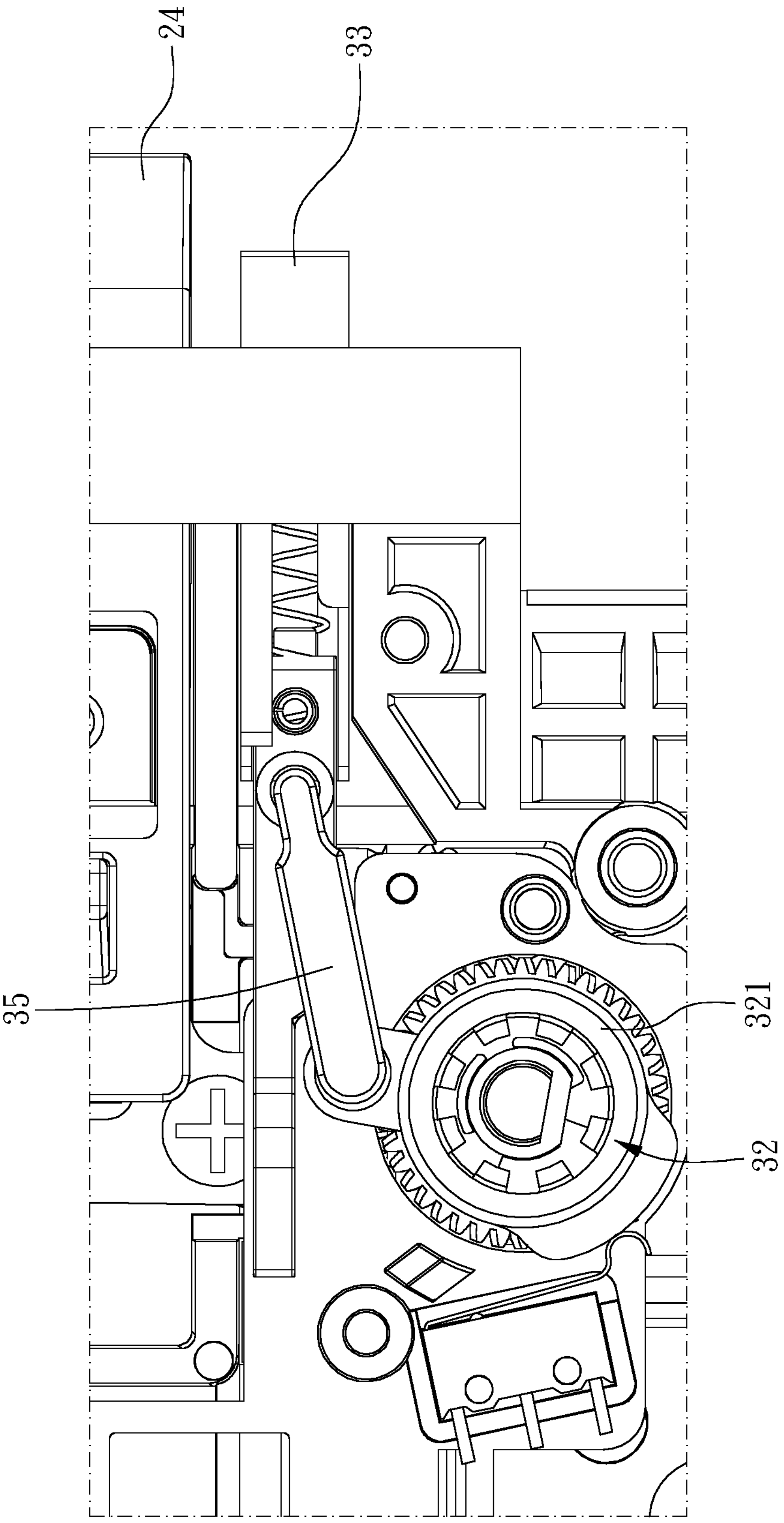
Figure 10:
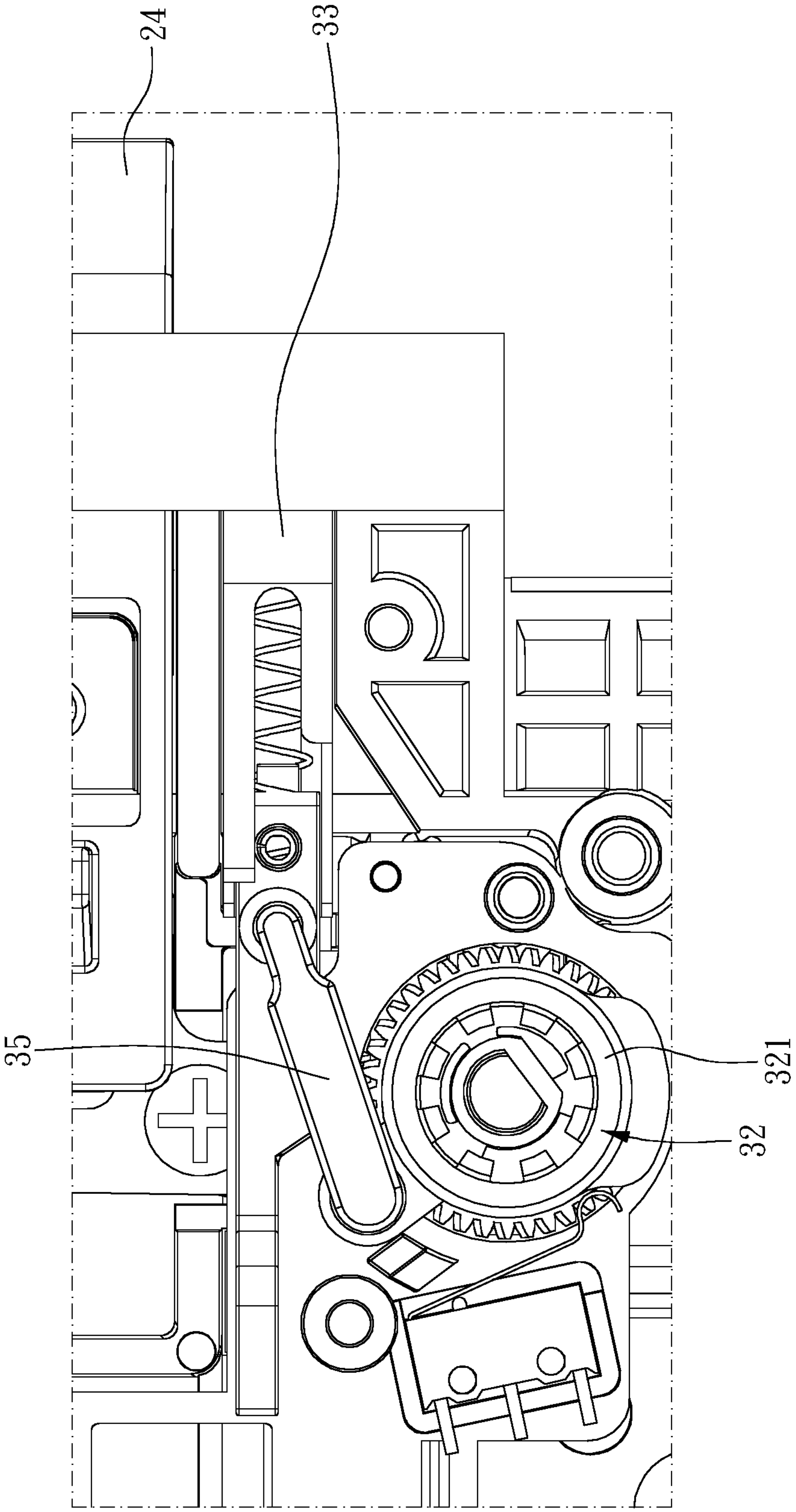
Figure 11:
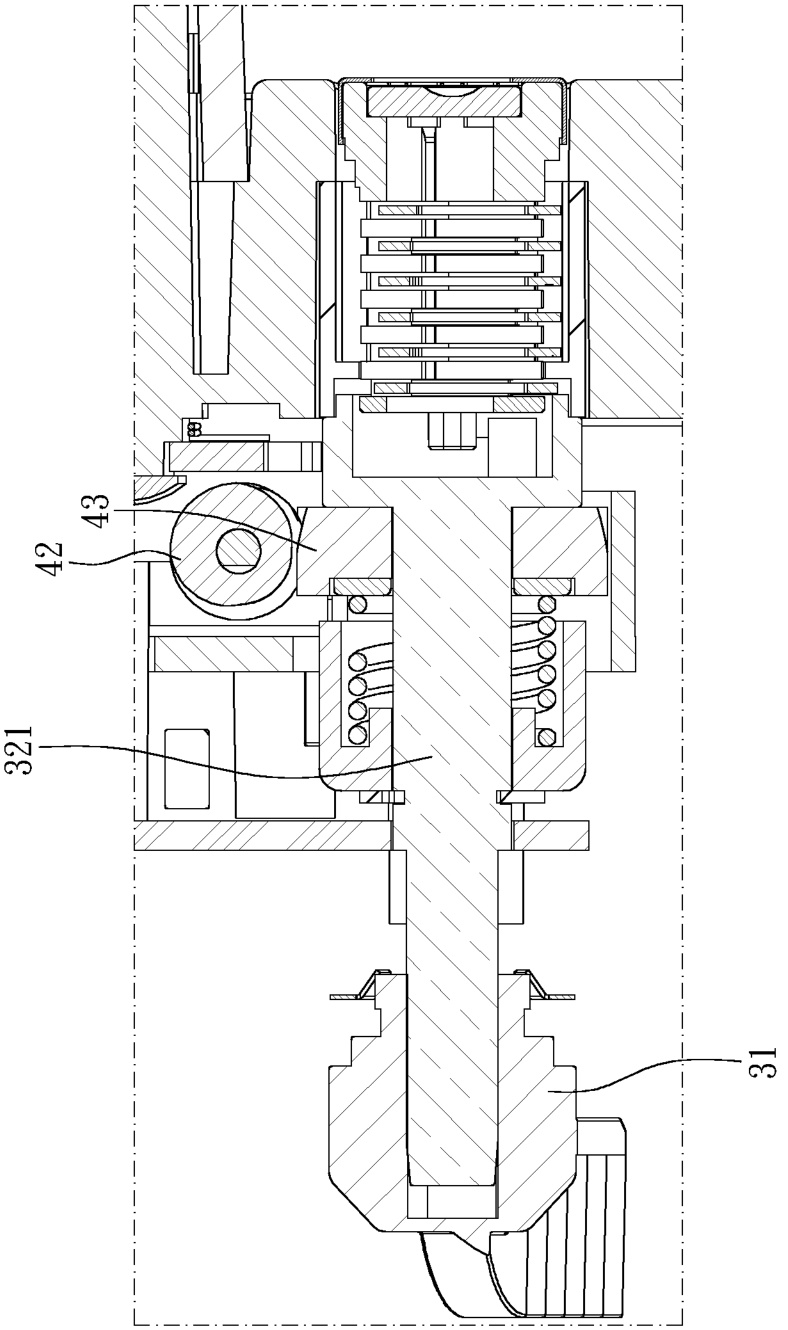
FIG. 11 is a breakdown drawing of a preferable embodiment of the present invention.

Please refer to FIGS. 1 to 11 for a preferable embodiment of the present invention. A vehicle door lock assembly of the present invention includes a housing 1, a first locking assembly 2 and a second locking assembly 3.

The housing 1 includes an inner side 11 and an outer side 12.

The first locking assembly 2 is disposed on the housing 1 and includes an inner handle 21, an outer handle 22, a first lock 23 and a first lock tongue 24, and the first lock tongue 24 has a tendency to move outward of the housing 1. The inner handle 21 and the outer handle 22 are movably disposed on the housing 1 and respectively control the first lock tongue 24 to move inward of the housing 1, and the first lock 23 is connected with a first blocking member 25. When the first lock 23 is locked, the first lock 23 drives the first blocking member 25 to move, and the first blocking member 25 is blocked with the outer handle 22 so that the first lock tongue 24 is uncontrollable to move inward of the housing 1 by the outer handle 22. When the first lock 23 is unlocked, the first lock 23 drives the first blocking member 25 to be unblocked with the outer handle 22, and the outer handle 22 can control the first lock tongue 24 to move inward of the housing 1.

The second locking assembly 3 is disposed on the housing 1 and includes a control member 31, a second lock 32 and a second lock tongue 33, and the second lock 32 is connected with a second blocking member 34. The second lock 32 and the control member 31 are co-movable with each other. The second lock 32 drives the second lock tongue 33 to move outward of the housing 1 when locked, and the second lock 32 drives the second lock tongue 33 to move inward of the housing 1 when unlocked. When the second lock 32 is locked, the second blocking member 34 is blocked with the outer handle 22 so that the first lock tongue 24 is uncontrollable to move inward of the housing 1 by the outer handle 22. When the second lock 32 is unlocked, the second blocking member 34 is unblocked with the outer handle 22 so that the first lock tongue 24 is controllable to move inward of the housing 1 by the outer handle 22.

Therefore, when the second lock 32 is locked, the second blocking member 34 is also blocked with the outer handle

22, and the outer handle 22 is non-actuatable via blocking of the first blocking member 25 and the second blocking member 34 so as to have a good structural strength. As such, when a force is exerted on the outer handle 22, the first lock tongue 24 will not be moved inward of the housing 1 so as to provide sufficient security.

Specifically, the outer handle 22 is swingably disposed on the housing 1, and the outer handle 22 has a first arm portion 221 protruding inward of the housing 1. When the outer handle 22 is swung, the first arm portion 221 is abutted against and drives the first lock tongue 24 to move inward of the housing 1. When the first lock 23 is locked, the first blocking member 25 is blocked with the first arm portion 221, and the first lock tongue 24 is uncontrollable to move inward of the housing 1 by the outer handle 22.

In this embodiment, the first lock 23 is rotatable relative to the housing 1, the first lock 23 includes a first keyhole 231, and the first keyhole 231 is located at the outer side 12 of the housing 1. The first blocking member 25 is slidably disposed on the housing 1, and a sliding direction of the first blocking member 25 is lateral to a moving direction of the first lock tongue 24 so that a key inserted within the first keyhole 231 can drive the first lock 23 to rotate for locking or unlocking.

The first lock tongue 24 has an engaging groove 241, and the first arm portion 221 protrudes within the engaging groove 241 so that the first arm portion 221 can drive the first lock tongue 24 to move inward and outward relative to the housing 1 for opening and closing a vehicle door.

Moreover, the inner handle 21 is swingably disposed on the housing 1, and the first lock tongue 24 has a second arm portion 242 laterally disposed thereon. When the inner handle 21 is swung, the inner handle 21 is abutted against the second arm portion 242 to move the first lock tongue 24 inward of the housing 1. When the first lock 23 is locked, the inner handle 21 is free of interference with the first blocking member 25, and the inner handle 21 can drive the first lock tongue 24 to move.

In this embodiment, the second blocking member 34 is swingably disposed on the housing 1, and the second lock 32 is rotatably disposed on the housing 1. The second lock 32 includes a second keyhole 323, and the second keyhole 323 is located at the outer side 12 of the housing 1. When the second lock 32 is unlocked, the second blocking member 34 is swung, and the second blocking member 34 is unblocked with the outer handle 22 so that the second lock 32 can be controlled to be locked or unlocked by a key inserted within the second keyhole 323 from the outer side 12.

Preferably, the second lock 32 includes a mandrel 321, the mandrel 321 has a projection 322 disposed thereon, and the second blocking member 34 has a return spring 341 disposed thereon. When the second lock 32 is locked, the projection 322 is abutted against the second blocking member 34 to drive the second blocking member 34 to be blocked with the outer handle 22. When the second lock 32 is unlocked, the projection 322 is free of abutment with the second blocking member 34, and the return spring 341 drives the second blocking member 34 to reset and be unblocked with the outer handle 22.

Furthermore, the mandrel 321 and the control member 31 are co-rotatable with each other so as to drive the mandrel 321 to rotate by rotation of the control member 31. The mandrel 321 and the second lock tongue 33 have a connecting rod 35 disposed therebetween. When the mandrel 321 is rotated, the connecting rod 35 drives the second lock tongue 33 to slide relative to the housing 1. The first lock tongue 24 has a tendency to move outward of the housing 1 so as to engage with the vehicle door when the vehicle door is closed, and the second lock tongue 33 is driven by the mandrel 321 to move inward or outward of the housing 1 so as to lock or unlock the vehicle door.

In this embodiment, the second lock 32 further includes a driving device 4 and an electronic lock 5, and the driving device 4 includes a motor 41, a first gear 42 and a second gear 43. The second gear 43 is sleeved to the mandrel 321, the first gear 42 is disposed on the motor 41, and the first gear 42 is engaged with the second gear 43. When the motor 41 drives the first gear 42 to rotate, the second gear 43 is driven by the first gear 42 and drives the mandrel 321 to rotate. The electronic lock 5 includes a fingerprint identification unit 51 and a numeric keyboard unit 52, and the electronic lock 5 is communicated with the motor 41. Therefore, the second lock 32 can also be controlled to be locked or unlocked by fingerprint identification or a password.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle door lock assembly, including:

a housing, including an inner side and an outer side;

a first locking assembly, disposed on the housing, including an inner handle, an outer handle, a first lock and a first lock tongue, the first lock tongue having a tendency to move outward of the housing, the inner handle and the outer handle being movably disposed on the housing and respectively controlling the first lock tongue to move inward of the housing, the first lock connected with a first blocking member; and a second locking assembly, disposed on the housing, including a control member, a second lock and a second lock tongue, the second lock connected with a second blocking member, the second lock and the control member being co-movable with each other, the second lock driving the second lock tongue to move outward of the housing when locked, the second lock driving the second lock tongue to move inward of the housing when unlocked;

wherein when the first lock is locked, the first lock drives the first blocking member to move, the first blocking member is blocked with the outer handle so that the first lock tongue is uncontrollable to move inward of the housing by the outer handle; when the first lock is unlocked, the first lock drives the first blocking member to be unblocked with the outer handle;

wherein when the second lock is locked, the second blocking member is blocked with the outer handle so that the first lock tongue is uncontrollable to move inward of the housing by the outer handle; when the second lock is unlocked, the second blocking member is unblocked with the outer handle so that the first lock tongue is controllable to move inward of the housing by the outer handle.

2. The vehicle door lock assembly of claim 1, wherein the outer handle is swingably disposed on the housing, the outer handle has a first arm portion protruding inward of the housing; when the outer handle is swung, the first arm portion is abutted against and drives the first lock tongue to move inward of the housing; when the first lock is locked, the first blocking member is blocked with the first arm portion, and the first lock tongue is uncontrollable to move inward of the housing by the outer handle.

3. The vehicle door lock assembly of claim 2, wherein the first lock is rotatable relative to the housing, the first lock includes a first keyhole, the first keyhole is located at the outer side of the housing, the first blocking member is slidably disposed on the housing, and a sliding direction of the first blocking member is lateral to a moving direction of the first lock tongue.

4. The vehicle door lock assembly of claim 2, wherein the first lock tongue has an engaging groove, and the first arm portion protrudes within the engaging groove.

5. The vehicle door lock assembly of claim 1, wherein the inner handle is swingably disposed on the housing, the first lock tongue has a second arm portion laterally disposed thereon; when the inner handle is swung, the inner handle is abutted against the second arm portion to move the first lock tongue inward of the housing.

6. The vehicle door lock assembly of claim 1, wherein the second blocking member is swingably disposed on the housing, the second lock is rotatably disposed on the housing, the second lock includes a second keyhole, the second keyhole is located at the outer side of the housing; and when the second lock is unlocked, the second lock is free of abutment with the second blocking member and the second blocking member is unblocked with the outer handle.

7. The vehicle door lock assembly of claim 1, wherein the second lock includes a mandrel, the mandrel has a projection disposed thereon, the second blocking member has a return spring disposed thereon; when the second lock is locked, the projection is abutted against the second blocking member to drive the second blocking member to be blocked with the outer handle; when the second lock is unlocked, the projection is free of abutment with the second blocking member, and the return spring drives the second blocking member to reset and be unblocked with the outer handle.

8. The vehicle door lock assembly of claim 7, wherein the mandrel and the control member are co-rotatable with each other, the mandrel and the second lock tongue have a connecting rod disposed therebetween; and when the mandrel is rotated, the connecting rod drives the second lock tongue to slide relative to the housing.

9. The vehicle door lock assembly of claim 7, wherein the second lock further includes a driving device, the driving device includes a motor, a first gear and a second gear, the second gear is sleeved to the mandrel, the first gear is disposed on the motor, the first gear is engaged with the second gear; and when the motor drives the first gear to rotate, the second gear is driven by the first gear and drives the mandrel to rotate.

10. The vehicle door lock assembly of claim 9, further including an electronic lock, wherein the electronic lock includes a fingerprint identification unit and a numeric keyboard unit, and the electronic lock is communicated with the motor.

* * * * *